US009292905B2

(12) United States Patent
Jiang et al.

(10) Patent No.: US 9,292,905 B2
(45) Date of Patent: Mar. 22, 2016

(54) METHOD AND DEVICE FOR PROCESSING OF AN IMAGE BY REGULARIZATION OF TOTAL VARIATION

(75) Inventors: Wen Fei Jiang, Wuhan (CN); Jian Jin, Beijing (CN); Zhibo Chen, Beijing (CN)

(73) Assignee: THOMSON LICENSING, Issy les Moulineaux (FR)

(*) Notice: Subject to any disclaimer, the term of this patent is extended or adjusted under 35 U.S.C. 154(b) by 129 days.

(21) Appl. No.: 14/128,626

(22) PCT Filed: Jun. 19, 2012

(86) PCT No.: PCT/CN2012/077138
§ 371 (c)(1),
(2), (4) Date: Dec. 22, 2013

(87) PCT Pub. No.: WO2012/175010
PCT Pub. Date: Dec. 27, 2012

(65) Prior Publication Data
US 2014/0126834 A1    May 8, 2014

(30) Foreign Application Priority Data
Jun. 24, 2011    (WO) ................ PCT/CN2011/076283

(51) Int. Cl.
G06K 9/40      (2006.01)
G06T 5/00      (2006.01)
H04N 1/409     (2006.01)

(52) U.S. Cl.
CPC . *G06T 5/00* (2013.01); *G06T 5/002* (2013.01); *H04N 1/4092* (2013.01); *G06T 2207/20192* (2013.01)

(58) Field of Classification Search
None
See application file for complete search history.

(56) References Cited

U.S. PATENT DOCUMENTS

| 5,398,292 | A  | * | 3/1995 | Aoyama ........................ 382/199 |
| 5,548,667 | A  | * | 8/1996 | Tu .................................. 382/285 |
| 5,621,467 | A  | * | 4/1997 | Chien et al. ............... 375/240.15 |
| 7,203,234 | B1 | * | 4/2007 | Zeng ........................ 375/240.03 |
| 8,150,197 | B2 | * | 4/2012 | Hwang et al. ................. 382/263 |

(Continued)

FOREIGN PATENT DOCUMENTS

| CN | 1806257    | 7/2006  |
| CN | 101674397  | 3/2010  |
| JP | 2008301336 | 12/2008 |

OTHER PUBLICATIONS

"Directional regularisation for constrained iterative image restoration", Lee et al., Electronics Letters, vol. 39, No. 23, Nov. 13, 1993, pp. 1642-1643.*

(Continued)

*Primary Examiner* — Wenpeng Chen
(74) *Attorney, Agent, or Firm* — Tutunjian & Bitetto, P.C.

(57) ABSTRACT

The invention addresses the problem that traditional Total Variation only enforces the horizontal and vertical intensity continuity and thus fails to reconstruct oblique edges well. In an embodiment, Directional Total Variation is defined which supports multiple gradient directions. It first pre-processes the image and determines the direction of edges/texture; Directional TV is calculated based on the gradients along the determined direction and its orthogonal direction. By utilizing adaptive weights to different directions in the regularization, Directional TV is capable of preserving edges independent from their orientation nicely. Thus, Directional TV regularization based image denoising, compression or super resolution tend to obtain better quality.

17 Claims, 3 Drawing Sheets

(56) References Cited

U.S. PATENT DOCUMENTS

| | | | |
|---|---|---|---|
| 2005/0123214 A1* | 6/2005 | Takahira | 382/266 |
| 2005/0151960 A1* | 7/2005 | Gerwe et al. | 356/121 |
| 2006/0285769 A1* | 12/2006 | Wang et al. | 382/274 |
| 2007/0047838 A1* | 3/2007 | Milanfar et al. | 382/289 |
| 2007/0071362 A1* | 3/2007 | Milanfar et al. | 382/299 |
| 2007/0154097 A1 | 7/2007 | Wang et al. | |
| 2007/0165961 A1* | 7/2007 | Lu | 382/254 |
| 2008/0013836 A1* | 1/2008 | Nakamura et al. | 382/209 |
| 2008/0175509 A1* | 7/2008 | Wheeler et al. | 382/260 |
| 2008/0292163 A1* | 11/2008 | DiBella et al. | 382/131 |
| 2009/0060286 A1* | 3/2009 | Wheeler et al. | 382/117 |
| 2009/0074318 A1* | 3/2009 | Yoo et al. | 382/260 |
| 2009/0110303 A1* | 4/2009 | Nishiyama et al. | 382/225 |
| 2009/0306507 A1* | 12/2009 | Hyun et al. | 600/443 |
| 2010/0103309 A1* | 4/2010 | Stern | 348/360 |
| 2010/0119120 A1* | 5/2010 | Bronstein et al. | 382/113 |
| 2010/0182459 A1* | 7/2010 | Hwang et al. | 348/240.99 |
| 2010/0226577 A1* | 9/2010 | Saito et al. | 382/195 |
| 2011/0075947 A1* | 3/2011 | Miyamoto | 382/300 |
| 2011/0090371 A1* | 4/2011 | Cote et al. | 348/237 |
| 2011/0164031 A1* | 7/2011 | Shi | 345/419 |
| 2011/0235921 A1* | 9/2011 | Springer et al. | 382/199 |
| 2011/0254921 A1* | 10/2011 | Pahalawatta et al. | 348/43 |
| 2012/0224765 A1* | 9/2012 | Kim et al. | 382/159 |

OTHER PUBLICATIONS

"Research of Image denoising method based on part adaptive total variation and median filter," Jicheng Liu, et al, The 1st International Conference on Information Science and Engineering (ICISE2009), 2009, pp. 2699-2702.*

"Fast and Robust Multiframe Super Resolution," Sina Farsiu, et al, IEEE Transactions on Image Processing, vol. 13, No. 10, Oct. 2004, pp. 1327-1344.*

"Deblurring Using Regularized Locally Adaptive Kernel Regression," Hiroyuki Takeda et al, IEEE Transactions on Image Processing, vol. 17, No. 4, Apr. 20, pp. 550-563.*

Jiang et al: "Method and Device for lossy compress-data and corresponding method and device for reconstructing data", Technicolor Patent Document PA110026, Apr. 22, 2011, pp. 1-19.

Zhang et al., "A super-resolution reconstruction algorithm for surveillance images", Journal of Signal Processing, vol. 90, No. 3, Mar. 1, 2010, pp. 848-859.

Zhou D., "An edge-directed bicubic interpolation algorithm", 2010 3rd International Congress on Image and Signal Processing,Oct. 16, 2010, pp. 1186-1189.

Omer:"Learning based document image super-resolution with directional total variaiion" Int. J.Open Problems Compt. Math., vol. 3, N° 4, pp. 592-616, Dec. 2010 ISSN 1998-6262.

X. Shu and N. Abuja, "Hybrid Compressive Sampling via a New Total Variation TVL1", Proc. ECCV™10, 393-404 (2010).

F. Guichard and F. Malgouyrea, "Total Variation based interpolation", Proc. European Signal Processing Conf., 3, 1741-1744 (1998).

F. Alter, S. Durand, J. Froment, "Adapted Total Variation for Artifact Free Decompression of JPEG Images", J. Math. Imaging and Vision, 23(2), 199 Œ 211 (2005).

Search Report Dated Oct. 4, 2012.

* cited by examiner

|   | 0 | 1 | 2 | 3 | 4 | 5 | 6 |
|---|---|---|---|---|---|---|---|
| 0 | M | A | B | C | D | E | F |
| 1 | I | a | b | c | d |   |   |
| 2 | J | e | f | g | h |   |   |
| 3 | K | i | j | k | l |   |   |
| 4 | L | m | n | o | p |   |   |

METHOD AND DEVICE FOR PROCESSING OF AN IMAGE BY REGULARIZATION OF TOTAL VARIATION

This application claims the benefit, under 35 U.S.C. §365 of International Application PCT/CN2012/077138, filed Jun. 19, 2012, which was published in accordance with PCT Article 21(2) on Dec. 27, 2012 in English and which claims the benefit of WO International patent application No. PCT/CN2011/076283, filed Jun. 24, 2011.

TECHNICAL FIELD

The invention is made in the field of image processing. In particular, the invention is made in the field of image processing by regularization of total variation.

BACKGROUND OF THE INVENTION

Total Variation (TV) is a widely-used measure for intensity continuity of images. It has been applied in many applications such as image restoration, deconvolution, decompression, inpainting, etc.

For instance T. Chan and C. Wong, "Total Variation Blind Deconvolution", IEEE Transactions on Image Processing, 7(3), 370-375 (1998), describe use for blind deconvolution and F. Guichard and F. Malgouyres, "Total Variation based interpolation", Proc. European Signal Processing Conf., 3, 1741-1744 (1998), use for resolution enhancement. Another use case is decompression described by F. Alter, S. Durand, J. Froment, in "Adapted Total Variation for Artifact Free Decompression of JPEG Images", J. Math. Imaging and Vision, 23(2), 199-211 (2005).

In particular, TV denoising is remarkably effective at simultaneously preserving edges while removing noise in flat regions, which is a significant advantage over the intuitive techniques such as linear smoothing or median filtering. The idea is based on the principle that signals with excessive and possibly spurious detail have high total variation, that is, the integral of the absolute gradient of the signal is high.

According to this principle, reducing the total variation of the signal subject to it being a close match to the original signal, removes unwanted detail whilst preserving important details such as edges.

Typically, TV is calculated with the horizontally and vertically gradient images. Denote an image by I, its horizontally and vertically gradient images, $\nabla_x I$ and $\nabla_y I$ are defined as $$\nabla_x I = I(x+1,y) - I(x,y) \text{ and } \nabla_y I = I(x,y+1) - I(x,y).$$

Then TV is calculated, wherein sqrt(˙) calculates the square root of its argument, by:

$$TV(I) = \Sigma_{i,j} \text{sqrt}(\nabla_x I(i,j)^2 + \nabla_x I(i,j)^2) \text{ or} \quad (1)$$

$$TV(I) = \Sigma_{i,j}(|\nabla x I(i,j)| + |\nabla x I(i,j)|) \quad (2)$$

Classical TV denoising tries to minimizes the Rudin-Osher-Fatemi (ROF) denoising model:

$$\min_f TV(f) + \lambda^*(\|f-n\|_2)^2/2 \quad (3)$$

where n is the noisy image, TV(f) is the total variation of f, and λ is a parameter which controls the denoising intensity.

The idea of TV regularization is increasingly employed in compressive sensing recently. For instance, it is proposed to recover images by a few samples based on the following equation, where Φ is some certain sampling matrix and y is the obtained sample.

$$\min_f TV(f) + \lambda^*(\|y-\Phi f\|_2)^2/2 \quad (4)$$

As can be seen in Eq. (3), traditional TV regularization does not consider the content of images, it simply smoothes the entire image with equivalent intensity from both horizontal and vertical direction. Therefore, the edges are smoothed more or less after TV denoising, especially the oblique edges. As a conclusion, the gradients along horizontal and vertical direction are not robust enough for various images. X. Shu and N. Ahuja, "Hybrid Compressive Sampling via a New Total Variation TVL1", Proc. ECCV'10, 393-404 (2010), propose a so called $TV_{11}$ for compressive sampling. $TV_{11}$ calculation is based on the horizontal and vertical gradients, and in addition, two diagonal partial gradients, $\nabla_x \nabla_y I(i,j)$ and $\nabla_y \nabla_x I(i,j)$ to enforce the diagonal intensity continuity.

SUMMARY OF THE INVENTION

Depending on the type of image or video content, edges within images follow different distributions. Averaging over the different content types, edges are randomly oriented and the inventors found the four directions of X. Shu and N. Ahuja still not being enough for randomly orientated edges.

Thus, the invention addresses the problem that traditional image processing by regularization of Total Variation (TV) only enforces the horizontal and vertical intensity continuity and thus fails to reconstruct oblique edges well.

In an embodiment, Directional Total Variation is defined which supports multiple gradient directions. It first pre-processes the image and determines the direction of edges and/or texture; Directional TV is calculated based on the gradients along the determined direction and its orthogonal direction. By utilizing adaptive weights to different directions in the regularization, Directional TV is capable of preserving edges independent from their orientation nicely. Thus, Directional TV regularization based image denoising, compression or super resolution tend to obtain better quality.

In further embodiments, the invention comprises the following features, alone, pair-wise combined or all together:

Computation of Directional Total Variation occurs by the gradient along the edge and its orthogonal direction.

Since direction is consistent in a small patch, pre-processing divides the image into small patches and checks a number of predefined directions for each patch. Then at least one predominant direction in the patch is determined, i.e. at least one direction is determined which is most likely to be along the edge.

There are various embodiments in which different techniques are used for choice of a predominant direction in the patch. For instance, there is an embodiment comprising calculating the ratio of the energy sum of gradients to that of its orthogonal direction, and choose the direction with the largest ratio.

This embodiment can be refined by determining the direction as being the one most similar to its upper and left neighbour blocks in case of flat regions, determined, e.g., by determining that the energy sums of gradients along multiple (or all) directions are equivalent.

Alternatively or additionally, the weights of the two orthogonal directions can be determined adaptively. Generally, the direction along the edge is given large weight and its orthogonal direction is given small weight. The weights are determined in the pre-processing, e.g., based on the ratio of energy sums.

Since there are applications where it may occur that some of the gradients are unavailable for some patches, Directional TV is calculated by the mean value of the available gradients scaled adequately.

A device for processing of an image comprises means for pre-processing the image for determining at least one predominant direction of at least one of edges and texture, means for determining a total variation of the image using a weighted sum of variations along the at least one predominant direction and along a direction orthogonal to the at least one predominant direction, and means for processing the image using regularization of the total variation.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not for limiting the invention's disclosure or scope defined in the claims.

In the figures.

EXEMPLARY EMBODIMENTS OF THE INVENTION

The invention may be realized on any electronic device comprising a processing device that may be correspondingly adapted. For instance, the invention may be realized in a television set, a mobile phone, a personal computer, a digital still camera, a digital video camera, a navigation system or a car video system.

Figures 1, 2:
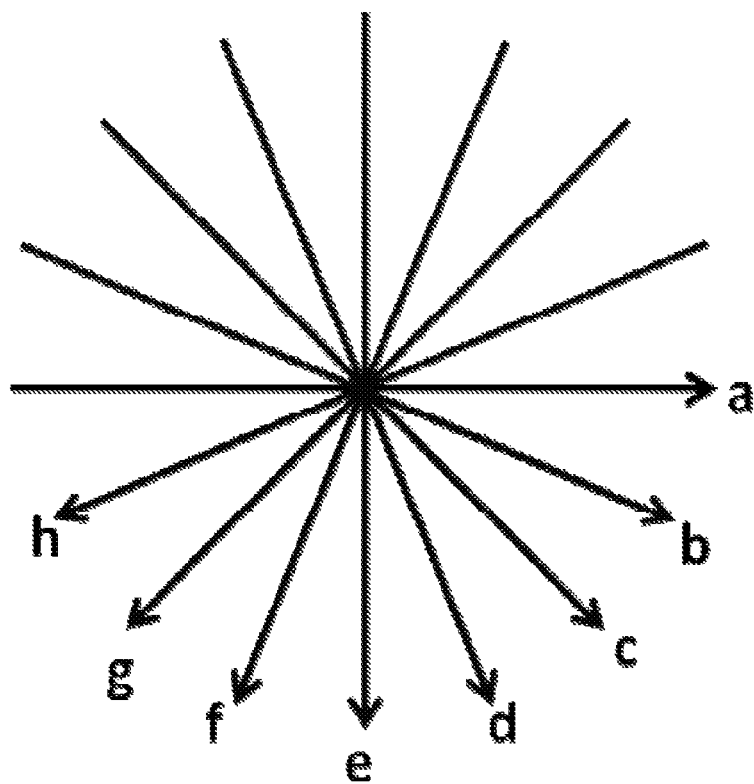
FIG. 1 depicts exemplarily supported gradient directions.
FIG. 2 exemplarily depicts pixels used for gradient calculation.

In an exemplary realization, the invention comprises direction determination and regularization of total variation with respect to the determined direction. In an embodiment, the direction is determined among eight predetermined direction candidates similar to those used for intra prediction in H.264 standard. The eight predetermined gradient directions are exemplarily depicted in FIG. 1.

The eight predetermined directions of the exemplary realization are defined as follows:

$$\nabla_a I = I(x,y) - I(x-1,y) \tag{5a}$$

$$\nabla_b I = I(x,y) - I(x-2,y-1) \tag{5b}$$

$$\nabla_c I = I(x,y) - I(x-1,y-1) \tag{5c}$$

$$\nabla_d I = I(x,y) - I(x-1,y-2) \tag{5d}$$

$$\nabla_e I = I(x,y) - I(x,y-1) \tag{5e}$$

$$\nabla_f I = I(x,y) - I(x+1,y-2) \tag{5f}$$

$$\nabla_g I = I(x,y) - I(x+1,y-1) \tag{5g}$$

$$\nabla_h I = I(x,y) - I(x+2,y-1) \tag{5h}$$

Or, when taking distances of pixels into consideration:

$$\nabla_a I = (I(x,y) - I(x-1,y)) \tag{6a}$$

$$\nabla_b I = (I(x,y) - I(x-2,y-1))/\sqrt{5} \tag{6b}$$

$$\nabla_c I = (I(x,y) - I(x-1,y-1))/\sqrt{2} \tag{6c}$$

$$\nabla_d I = (I(x,y) - I(x-1,y-2))/\sqrt{5} \tag{6d}$$

$$\nabla_e I = (I(x,y) - I(x,y-1)) \tag{6e}$$

$$\nabla_f I = (I(x,y) - I(x+1,y-2))/\sqrt{5} \tag{6f}$$

$$\nabla_g I = (I(x,y) - I(x+1,y-1))/\sqrt{2} \tag{6g}$$

$$\nabla_h I = (I(x,y) - I(x+2,y-1))/\sqrt{5} \tag{6h}$$

The energy function $E_x = \Sigma_{i,j} |\nabla_x I(i,j)|$ with $x \in \{a, b, c, d, e, f, g, h\}$ can be used for direction determination, e.g. by selecting x such that $E_x$ is maximized.

In an exemplary embodiment, the following edge significant indicators are used:

$$R_a = E_a/E_e = 1/R_e \tag{7a}$$

$$R_b = E_b/E_f = 1/R_f \tag{7b}$$

$$R_c = E_c/E_g = 1/R_g \tag{7c}$$

$$R_d = E_d/E_h = 1/R_h \tag{7d}$$

Then, the direction is determined as follows:

(a) Pre-processing the image in units of n×n blocks for obtaining all candidate directional gradients, where n is the block size; and (b) Calculating $R_x$ for each directional gradient and selecting the direction with largest $R_x$ in case $|R_x - R_y| \geq \text{thr}$ for all $y \neq x$, where thr is a predefined threshold.

In case multiple edge significant indicator candidates $R_x$, $R_y$ are similar, i.e. $|R_x - R_y| < \text{thr}$, and there is a direction y which is more similar to the direction of the upper and/or left block's direction, y is selected instead of x even if x is the direction with largest $R_x$.

Then, total variation of the determined direction and the direction orthogonal thereto is determined as $$TV_{DIR}(I) = \Sigma_{i,j} \text{sqrt}(\alpha_{i,j} \nabla_{e\_ij} I(i,j)^2 + \beta_{i,j} \nabla_{o\_ij} I(i,j)^2) \tag{8}$$

Where $\nabla_{e\_ij} I(i,j)$ is the gradient along the determined direction e_ij and $\nabla_{o\_ij} I(i,j)$ is the direction orthogonal thereto. Weights $\alpha_{i,j}$ and $\beta_{i,j}$ are computed using $E_x$ along all gradient directions, $x \in \{a, b, c, d, e, f, g, h\}$ wherein $\alpha_{i,j}$ is reverse proportional to $E_k$ and $\beta_{i,j}$ shows direct proportionality with $E_k$.

In a first exemplary embodiment, $TV_{DIR}(I)$ is used in denoising by finding f which minimizes $$TV_{DIR}(f) + \lambda^*(\|f-n\|_2)^2/2 \tag{9}$$

where n is the input noisy image. The edge directions are determined as described above.

In an exemplary embodiment targeting uniform-intensity denoising, the weights in $TV_{DIR}(f)$ can be normalized by $C_{i,j} = \text{sqrt}(\alpha_{i,j} + \beta_{i,j})$:

$$TV_{DIR}(I) = \Sigma_{i,j} \text{sqrt}(\alpha_{i,j} \nabla_{e\_ij} I(i,j)^2 + \beta_{i,j} \nabla_{o\_ij} I(i,j)^2)/C_{i,j} \tag{10}$$

Then, the denoising intensity is merely dependent on the weighting parameter $\lambda$.

TV regularization based reconstruction makes it possible for the video codec to recover pictures with incomplete DCT coefficients. TV regularization is performed in unit of block instead of the whole frame. The reconstruction is based on Eq. (11), where $b_p$ is the prediction of block b and $\Phi$ is the DCT and quantization process.

$$\min_b TV(b) + \lambda^*(\|y - \Phi(b - b_p)\|_2)^2/2 \tag{11}$$

In an exemplary embodiment where directions and weights are consistent per block, $TV_{DIR}(f)$ can be simplified using $C = \text{sqrt}(\alpha + \beta)$ by:

$$TV_{DIR}(I) = \Sigma_{i,j} \text{sqrt}(\alpha_{i,j} \nabla_{e\_ij} I(i,j)^2 + \beta_{i,j} \nabla_{o\_ij} I(i,j)^2)/C \tag{12}$$

First, the available but incomplete DCT coefficients are used to construct an initial block reconstruction, $b_{init} = \Phi^{-1}y + b_p$, to determine the edge direction, where $\Phi^{-1}$ is the dequantization and inverse DCT process.

Since the pixels on the bottom and right are unavailable for the current block, the gradients of outer pixels may not be computed. For the example of a block of size four in FIG. 2, the gradients of pixel I(4,1), I(4,2), I(4,3) and I(4,4) along direction g (cf. FIG. 1) cannot be computed, because required pixels I(5,0), I(5,1), I(5,2) and I(5,3) are not yet available.

Therefore, a parameter $c_{ijk}$ is defined to denote the availability of the gradient of the pixel (i,j) along the direction k, with $c_{ijk}=1$ if $\nabla_k I(i,j)$ is available, $c_{ijk}=0$ if $\nabla_k I(i,j)$ is unavailable.

In an exemplary embodiment where availability of pixels required for gradient calculation is considered, the Directional TV is calculated by the mean value of the available gradients scaled by the total number of pixels, i.e. $TV_{DIR}(f)$ can be simplified using $C_k = n^2 * \text{sqrt}(\alpha+\beta)/\Sigma_{i,j} c_{ijk}$ by:

$$TV_{DIR}(I) = \Sigma_{i,j} \text{sqrt}(\alpha_{i,j} \nabla_{e\_ij} I(i,j)^2 + \beta_{i,j} \nabla_{o\_ij} I(i,j)^2)/C_k \quad (13)$$

Embodiments of the proposed invention can be used for image processing applications like denoising or deblurring.

Figure 3:
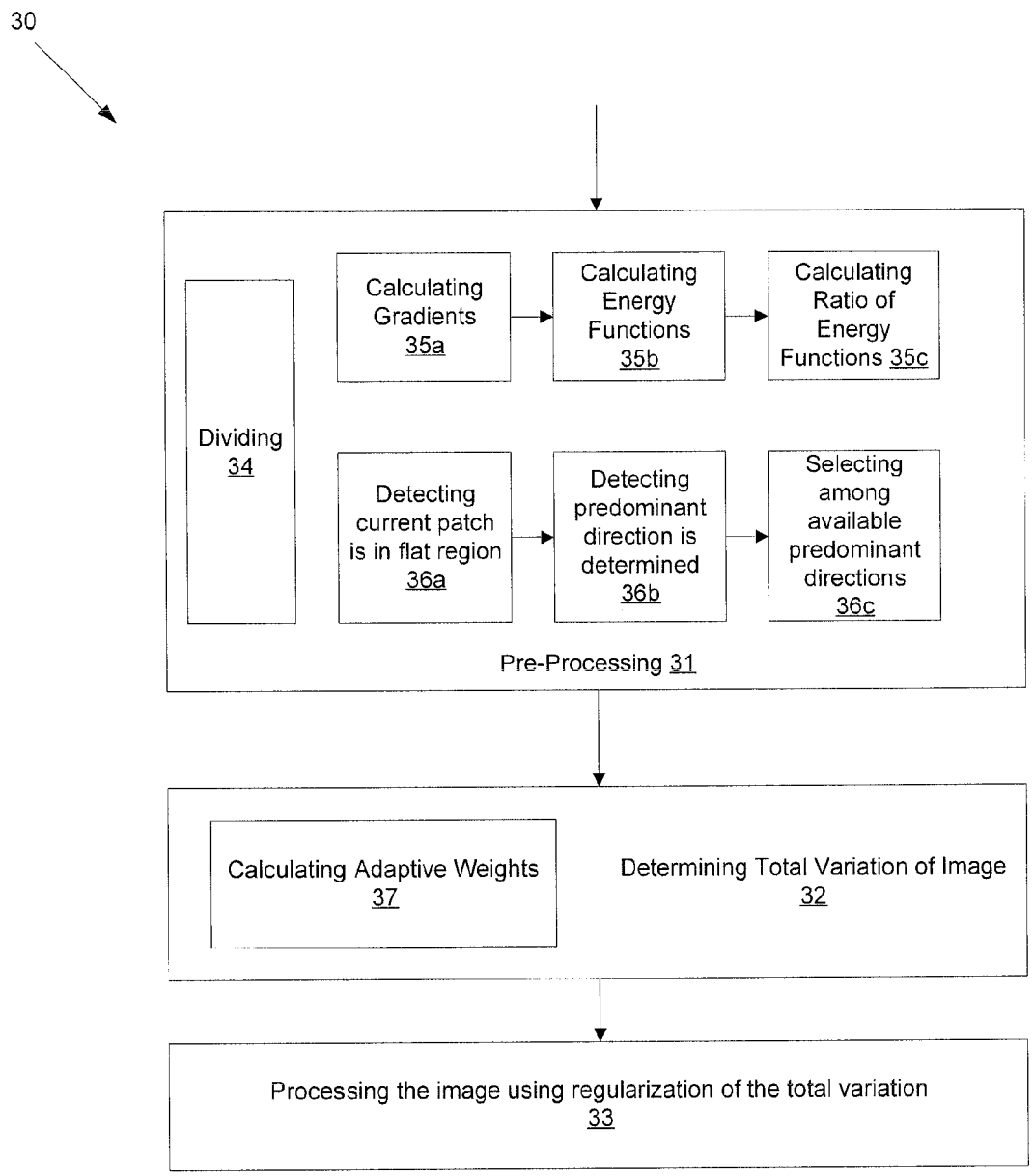
FIG. 3 a flow-chart of the method for processing an image using regularization of total variation.

FIG. 3 shows a flow-chart of the method 30 for processing an image using regularization of total variation. The method comprises steps of pre-processing 31 the image for determining at least one predominant direction of at least one of edges and texture, determining 32 a total variation of the image using a weighted sum of variations along the at least one predominant direction and along a direction orthogonal to the at least one predominant direction, and processing 33 the image using regularization of the total variation.

In one embodiment, the pre-processing step 31 comprises dividing 34 the image into patches and determining a predominant direction for each patch.

In one embodiment, the pre-processing step 31 comprises calculating 35a gradients for each patch, as in eq. (5a-h) or eq. (6a-h), calculating 35b an energy function $E_{x,x=a,\ldots,h}$ for each gradient, calculating 35c a ratio $R_{x,x=a,\ldots,h}$ between energy functions of orthogonal gradients, as in eq. (7a-d), and determining the predominant direction according to the energy function ratio.

In one embodiment, the predominant direction is selected as the one that has a maximum energy function ratio.

In one embodiment, the predominant direction is only selected if its energy function ratio exceeds, by at least a predetermined positive threshold, each energy function ratio of gradients in different directions.

In one embodiment, selecting the predominant direction comprises detecting 36a that a current patch is in a flat region, detecting 36b that a predominant direction has already been determined for an upper and/or left neighbour patch of the current patch, and selecting 36c among available possible predominant directions the most similar direction for the current patch. This is particularly advantageous if e.g. multiple similar candidate directions of similar strength are available for a current patch.

Flat regions (i.e. regions with very low or no predominance of a direction) can be detected in various ways. In one embodiment, a flat region is detected by determining that the energy sums of gradients along multiple directions are equal, or at least substantially equal.

In one embodiment, for determining 32 a total variation of the image, the variation along the at least one predominant direction is given higher weight than the variation along a direction orthogonal to the at least one predominant direction.

In one embodiment, the method further comprises (e.g. in the total variation determining step 32, as exemplarily shown in FIG. 3) a step of calculating 37 adaptive weights $\alpha,\beta$ for said weighted sum of variations along the at least one predominant direction and along a direction orthogonal to the at least one predominant direction. The weights $\alpha,\beta$ can be calculated based on the ratio of energy sums. In one embodiment, the weight $\alpha_{i,j}$ that is applied to the variations along the at least one predominant direction x (with $x \in \{a, b, c, d, e, f, g, h\}$) is reverse proportional to the respective energy sum $E_x$, and the weight $\beta_{i,j}$ that is applied to the variations orthogonal to the at least one predominant direction is reverse proportional to this energy sum $E_x$.

In one embodiment, the Directional Total Variation is calculated by scaling and averaging available gradients for patches if not all of the required gradients are available. This comprises a step of determining that not all of the required gradients are available.

Figure 4:
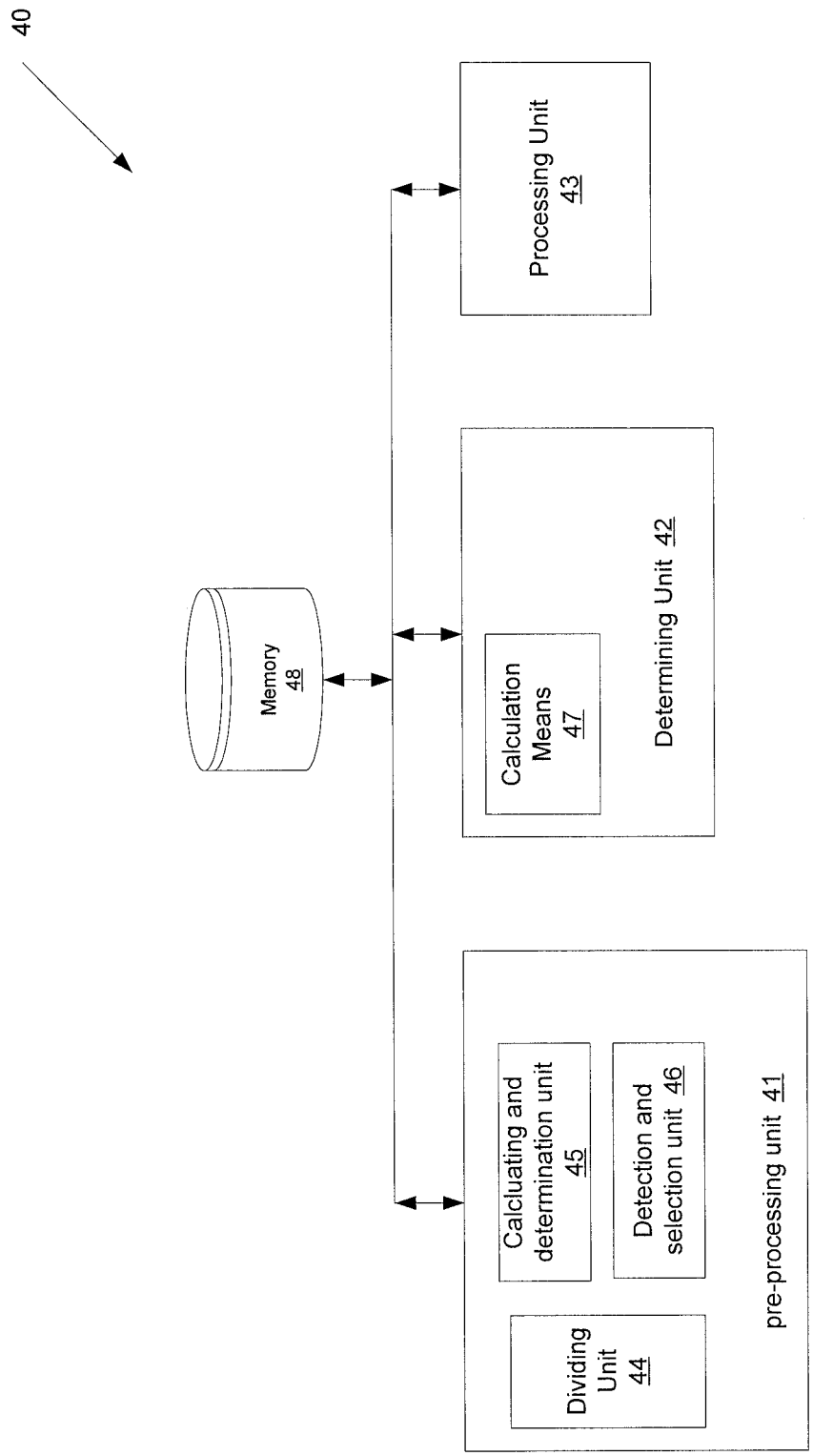
FIG. 4 a block diagram of a device for processing an image using regularization of total variation.

FIG. 4 shows a block diagram of a device for processing an image using regularization of total variation. The device 40 comprises a pre-processing unit 41 for pre-processing the image in order to determine at least one predominant direction of at least one of edges and texture, a TV determining unit 42 for determining a total variation of the image using a weighted sum of variations along the at least one predominant direction and along a direction orthogonal to the at least one predominant direction, and a processing unit 43 for processing the image using regularization of the total variation. In one embodiment, the device comprises also a memory 48 that some or all of the units can access.

In one embodiment, the pre-processing unit 41 comprises dividing means 44 for dividing the image into patches. Then, a predominant direction is determined for each patch.

In one embodiment, the pre-processing unit 41 comprises a calculating and determination unit 45 for calculating gradients for each patch, as in eq. (5a-h) or eq. (6a-h), calculating an energy function $E_{x,x=a,\ldots,h}$ for each gradient, calculating a ratio $R_{x,x=a,\ldots,h}$ between energy functions of orthogonal gradients, as in eq. (7a-d), and determining the predominant direction as the one that has a maximum energy function ratio.

In one embodiment, for selecting the predominant direction, the pre-processing unit 41 comprises a detection and selection unit 46 for detecting that a current patch is in a flat region, detecting that a predominant direction has already been determined for an upper and/or left neighbour patch of the current patch, and selecting among available possible predominant directions the most similar direction for the current patch.

In one embodiment, the TV determining unit 42 comprises calculation means 47 for calculating the Directional TV based on the gradients along the determined at least one predominant direction and its orthogonal direction.

In one embodiment, the TV determining unit 42 comprises a calculation unit 47 for calculating adaptive weights $\alpha,\beta$ for the weighted sum of variations along the at least one predominant direction and along a direction orthogonal to the at least one predominant direction.

The invention can advantageously also be used as a fundamental component of an image/video compression scheme, like a compressive sensing based compression approach.

CITED REFERENCES

[1] T. Chan and C. Wong, "Total Variation Blind Deconvolution", IEEE Transactions on Image Processing, 7(3), 370-375 (1998)

[2] F. Guichard and F. Malgouyres, "Total Variation based interpolation", Proc. European Signal Processing Conf., 3, 1741-1744 (1998)

[3] F. Alter, S. Durand, J. Froment, "Adapted Total Variation for Artifact Free Decompression of JPEG Images", J. Math. Imaging and Vision, 23(2), 199-211 (2005)

[4] X. Shu and N. Ahuja, "Hybrid Compressive Sampling via a New Total Variation TVL1", Proc. ECCV'10, 393-404 (2010)

The invention claimed is:

1. A method for processing of an image comprising:
pre-processing the image for determining at least one predominant direction of at least one of edges and texture;
determining a total variation of the image using a weighted sum of variations along the at least one predominant direction and along a direction orthogonal to the at least one predominant direction; and
processing the image using regularization of the total variation.

2. The method of claim 1, wherein said pre-processing comprises dividing the image into patches and determining a predominant direction for each patch.

3. The method of claim 1, wherein said pre-processing further comprises:
calculating gradients for each patch,
calculating an energy function for each gradient,
calculating a ratio between energy functions of orthogonal gradients, and
determining the predominant direction according to the ratio between the energy functions.

4. The method of claim 3, wherein said pre-processing further comprises determining that the at least one predominant direction has an energy function ratio further exceeding, by at least a predetermined positive threshold, each energy function ratio of gradients in different directions.

5. The method of claim 3, further comprising using a maximal energy function ratio for determining weights of said weighted sum.

6. The method of claim 2, wherein the determining a predominant direction further comprises:
detecting that a current patch is in a flat region,
detecting that a predominant direction has already been determined for an upper and/or left neighbor patch of the current patch, and
selecting among available possible predominant directions the most similar direction for the current patch.

7. The method according to claim 1, wherein for determining a total variation of the image, the variation along the at least one predominant direction is given higher weight than the variation along a direction orthogonal to the at least one predominant direction.

8. The method according to claim 1, further comprising calculating adaptive weights for said weighted sum of variations along the at least one predominant direction and along a direction orthogonal to the at least one predominant direction, the weights being calculated based on a ratio of energy sums.

9. The method according to claim 8, wherein a first weight $\alpha_{i,j}$ that is applied to the variations along the at least one predominant direction x is reverse proportional to a respective energy sum $E_x$, and a second weight $\beta_{i,j}$ that is applied to the variations orthogonal to the at least one predominant direction is reverse proportional to said energy sum $E_x$.

10. The method according to claim 1, further comprising:
determining for at least one patch that not all of the required gradients are available; and
calculating a Directional Total Variation by scaling and averaging the determined available gradients for the at least one patch.

11. A device for processing of an image, comprising
a pre-processing unit adapted to pre-process the image in order to determine at least one predominant direction of at least one of edges and texture;
a Total Variation determining unit adapted to determine a total variation of the image using a weighted sum of variations along the at least one predominant direction and along a direction orthogonal to the at least one predominant direction; and
a processing unit adapted to process the image using regularization of the total variation.

12. The device according to claim 11, further comprising dividing means for dividing the image into patches, wherein for each patch a predominant direction is determined.

13. The device according to claim 12, wherein the pre-processing unit comprises a calculating and determination unit adapted to:
calculate gradients for each patch,
calculate an energy function for each gradient,
calculate a ratio between energy functions of orthogonal gradients, and
determine the predominant direction as the one that has a maximum energy function ratio.

14. The device according to claim 13, wherein said calculating and determination unit of said pre-processing unit is further adapted to determine that the at least one predominant direction has an energy function ratio further exceeding, by at least a predetermined positive threshold, each energy function ratio of gradients in different directions.

15. The device according to claim 13, wherein the processing unit is adapted to use a maximal energy function ratio for determining weights of said weighted sum.

16. The device according to claim 12, further comprising a detection and selection unit adapted to:
detect that a current patch is in a flat region,
detect that a predominant direction has already been determined for at least one of the upper and left neighbor patch of the current patch, and
select among available possible predominant directions the most similar direction for the current patch.

17. The device according to claim 11, wherein the Total Variation determining unit comprises calculation means for calculating a Directional Total Variation based on the gradients along the determined at least one predominant direction and its orthogonal direction.

* * * * *